(12) United States Patent
Dos Santos

(10) Patent No.: US 11,809,898 B2
(45) Date of Patent: Nov. 7, 2023

(54) PROCESS IMPLEMENTED IN AN INTEGRATED CIRCUIT MODULE, CORRESPONDING INTEGRATED CIRCUIT MODULE, SYSTEM COMPRISING SUCH A MODULE AND CORRESPONDING COMPUTER PROGRAM

(71) Applicant: IDEMIA France, Courbevoie (FR)

(72) Inventor: Elder Dos Santos, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 276 days.

(21) Appl. No.: 17/189,846

(22) Filed: Mar. 2, 2021

(65) Prior Publication Data
US 2021/0279093 A1 Sep. 9, 2021

(30) Foreign Application Priority Data
Mar. 5, 2020 (FR) ...................................... 2002251

(51) Int. Cl.
G06F 9/46 (2006.01)
G06F 9/48 (2006.01)
G06F 11/14 (2006.01)

(52) U.S. Cl.
CPC .............. *G06F 9/485* (2013.01); *G06F 9/461* (2013.01); *G06F 11/1448* (2013.01)

(58) Field of Classification Search
CPC ....... G06F 9/485; G06F 9/461; G06F 11/1448
See application file for complete search history.

(56) References Cited

U.S. PATENT DOCUMENTS 9,928,168 B2 * 3/2018 Molloy ............... G06F 12/0804
2010/0131789 A1 * 5/2010 Kimura ..................... H04N 5/63
713/323

(Continued)

FOREIGN PATENT DOCUMENTS

EP      2 492 810      8/2012
EP      3 547 195      10/2019

OTHER PUBLICATIONS

Search Report for FR Application No. 2002251 dated Oct. 5, 2020, 10 pages.

*Primary Examiner* — Tammy E Lee
(74) *Attorney, Agent, or Firm* — NIXON & VANDERHYE

(57) ABSTRACT

A method implemented in an integrated-circuit module including a processor accessing a non-volatile memory wherein execution-context-defining software applications to be executed by the processor for communication with a device are stored, and to access a volatile memory storing execution data of a software application currently being executed. The software applications include a first being executed and a second previously suspended, the method including, upon receiving a command from the electronic device: suspending execution of the first software application being executed including saving the content of the volatile memory in a first backup location of the non-volatile memory, stopping the execution of the first software application; and resuming the previously suspended execution of the second software application including transferring into the volatile memory, from a second backup location of the non-volatile memory, execution data relating to the previously suspended execution of the second software, and executing the second software application.

13 Claims, 2 Drawing Sheets

(56) References Cited

U.S. PATENT DOCUMENTS

| | | |
|---|---|---|
| 2015/0268968 A1 | 9/2015 | Siddiqi et al. |
| 2019/0050844 A1* | 2/2019 | Pan .................. G06Q 20/3227 |
| 2019/0370009 A1* | 12/2019 | Venkatraman ........ G06F 3/0604 |
| 2020/0334108 A1* | 10/2020 | Raghunathan ........ G06F 16/248 |

* cited by examiner

PROCESS IMPLEMENTED IN AN INTEGRATED CIRCUIT MODULE, CORRESPONDING INTEGRATED CIRCUIT MODULE, SYSTEM COMPRISING SUCH A MODULE AND CORRESPONDING COMPUTER PROGRAM

CROSS-REFERENCE TO RELATED APPLICATIONS

This application claims priority to FR Patent Application No. 2002251 filed Mar. 5, 2020, the entire contents of which are hereby incorporated by reference.

TECHNICAL FIELD

The present invention relates to the technical field of integrated-circuit modules. The invention relates in particular to the field of integrated-circuit modules including a plurality of execution-context-defining software applications.

The invention relates particularly to a method implemented in an integrated-circuit module, a corresponding integrated-circuit module, a system comprising an integrated-circuit module according to the invention and an electronic device, as well as a computer program implementing the method according to the invention.

TECHNOLOGICAL BACKGROUND

An integrated-circuit module conventionally allows implementation of a context-defining software application, that is to say a software application configured to allow access to services in a secure fashion, in cooperation with an electronic device.

For example, an integrated-circuit module may be a removable chip card, for example a SIM (Subscriber Identity Module) card or a bank card, and be adapted to be inserted removably in an electronic device, for example a smartphone or a bank payment terminal. The integrated-circuit module is sometimes in the form of an electronic chip integrated fixedly, in particular soldered to the electronic device; in the case of a SIM card, then eSIM (embedded SIM) is spoken of, or iSIM (integrated SIM). In some cases the iSIM is included in an SOC (System on Chip).

Execution-context-defining software includes for example user identification data, manufacturer identification data and encryption keys making it possible to establish a secure connection with the electronic device or to have access to certain services.

For example, in the telephony field, the integrated-circuit module is a SIM card and the execution-context-defining software application makes it possible to define a "communication profile". It makes it possible to establish a secure connection to a telephone network managed by a given operator.

In other applications, for example banking applications, the integrated-circuit module is a bank chip card and the context-defining software application makes it possible to perform a payment operation in a secure fashion in cooperation with a bank payment terminal.

There are electronic devices adapted to receive a plurality of secure elements. For example, some smartphones include two SIM-card ports, which enables the telephone to access a plurality of context-defining software applications and therefore to communicate with a plurality of telephone networks.

There are also integrated-circuit modules configured to implement a plurality of context-defining software applications. Thus the same integrated-circuit module may include two context-execution software applications. This advantageously makes it possible to dispense with the use of a plurality of integrated-circuit modules and therefore to save on space.

In this context there are in particular integrated-circuit modules configured to implement context-defining software applications relating to distinct fields of application. For example, the same integrated-circuit module may implement a first context-defining software application that is a communication protocol adapted to establish a secure communication with a given telephone network and second context-defining software application that may be a banking profile adapted to perform banking transactions.

However, managing various software applications by means of the same electronic device and/or by means of the same integrated-circuit module currently involves using conventional session opening and closing mechanisms that prevent any competing use of these various software applications.

Faced with the increase in the number of execution-context-defining software applications that can be implemented on the same integrated-circuit module and faced with the variety of the fields of application thereof, it is necessary to establish simple and reliable means for managing these software applications.

SUMMARY OF THE INVENTION

The invention responds to this requirement by proposing a method for accessing the various execution-context-defining software applications sequentially. This method may be implemented by a processor of an integrated-circuit module that executes a corresponding computer program.

According to one aspect of the invention, a method is proposed, implemented in an integrated-circuit module comprising a processor configured to access a non-volatile memory wherein a plurality of execution-context-defining software applications adapted to be executed by a processor for communication with an electronic device are stored, and to access a volatile memory configured to store execution data of a software application currently being executed, the plurality of software applications comprising a first software application currently being executed and a second software application previously suspended, the method comprising, on reception of a command from the electronic device,
  a. suspension of the execution of the first software application currently being executed comprising
    i. saving the content of the volatile memory in a first backup location of the non-volatile memory,
    ii. stopping the execution of the first software application,
  b. resumption of the previously suspended execution of the second software application comprising
    i. transferring into the volatile memory, from a second backup location of the non-volatile memory, execution data relating to the previously suspended execution of the second software application, and
    ii. executing the second software application.

By virtue of the invention, it is therefore possible to manage, in a simple and reliable fashion, a plurality of execution-context-defining software applications, by providing in particular the saving of the execution context thereof in the non-volatile memory.

The plurality of software applications may include at least one communication-profile-defining software application.

The integrated-circuit module may include said volatile memory and/or said non-volatile memory.

The method may include deletion of the content of the second backup location following the resumption of execution of the second software application.

Deletion of the content of the backup location advantageously avoids fortuitous reuse of the execution data that are saved therein, in particular when there is a subsequent resumption of execution of another software application or of the same software application.

According to one embodiment, the method includes an initial step of creating and allocating a respective backup location of the non-volatile memory for each software application in said plurality of software applications.

This embodiment advantageously simplifies the implementation of the method. This is because the memory locations initially created, for example during an initial coupling of the module to an electronic device, will no longer have to be created in the remainder of the implementation of the method.

According to one embodiment, the method includes, for each first suspension of execution of a software application currently being executed, a creation of a respective backup location in the non-volatile memory and an allocation of said respective backup location to said software application currently being executed.

This embodiment advantageously allows greater flexibility in the implementation of the method and in particular avoids, in the case where the execution of one or more software applications is not suspended, the unnecessary creation of backup locations that will not be used.

According to one embodiment, said suspension includes the creation, by the integrated-circuit module, of a first check tag associated with the first software application and a sending of said first check tag to the electronic device, and wherein said resumption of execution of the second software application includes a sending, by the electronic device to the integrated-circuit module, of a second check tag previously created, and a checking, by the integrated-circuit module, of the match between the second check tag and the second software application.

In a variant embodiment, the check tag is an authentication token, the method then including at least one exchange of at least one item of information between the integrated-circuit module and the electronic device allowing for example the generation of a session key. The method may include an authentication of the token, for example by means of an HMAC (keyed-hash message authentication code), and optionally encryption thereof by means of said session key.

Creating check tags advantageously ensures that the resumptions of execution of the software applications take place on the basis of the correct execution context, and not on the basis of an erroneous execution context, for example corresponding to another software application. The reliability of the method is thus improved.

According to one aspect, an integrated-circuit module is proposed, comprising a communication interface and a processor configured to access a non-volatile memory wherein a plurality of execution-context-defining software applications are stored, adapted to be executed by a processor for communication via the communication interface, and to access a volatile memory configured to store execution data of a software application currently being executed, the module being configured to, on reception of a command on its communication interface, the plurality of software applications comprising a first software application currently being executed and a second software application previously suspended, a. suspend execution of the first software application currently being executed, the suspension comprising
 i. saving the content of the volatile memory in a first backup location of the non-volatile memory,
 ii. stopping the execution of the first software application,
b. resume the previously suspended execution of the second software application, the resumption comprising
 i. transferring into the volatile memory, from a second backup location of the non-volatile memory, execution data relating to the previously suspended execution of the second software application, and
 ii. executing the second software application.

The plurality of software applications may include at least one communication-profile-defining software application.

The integrated-circuit module may include said volatile memory and/or said non-volatile memory.

The integrated-circuit module may be configured to delete the content of the second backup location following the resumption of execution of the second software application.

According to one embodiment, the integrated-circuit module is configured to create and allocate a respective backup location of the non-volatile memory for each software application in said plurality of software applications.

According to one embodiment, the integrated-circuit module is configured to create and allocate, to each first suspension of a software application currently being executed, a respective backup location in the non-volatile memory and to allocate said respective backup location to said software application currently being executed.

According to one embodiment, the integrated-circuit module is configured to
a. create, during said suspension of execution of the first software application, a first check tag associated with the first software application and to send said first check tag to the communication interface,
b. receive from the communication interface a second check tag previously created and check the match between the second check tag and the second software application, and
c. resume execution of the second software application if the second check tag corresponds to the second software application.

According to one aspect, a system is proposed comprising an integrated-circuit module according to the invention and an electronic device configured to communicate with the integrated-circuit module via the communication interface.

According to one embodiment, the device is configured to send said command that includes a first field comprising information relating to the suspension of the first software application and a second field comprising information identifying the second software application.

Thus it is possible to demand the suspension and resumption of execution by sending a single command.

According to one aspect, a computer program is proposed comprising instructions leading to the implementation of the method according to the invention when the program is executed by said processor.

The various features, variants and embodiments of the invention may be associated with each other according to various combinations insofar as they are not incompatible or mutually exclusive.

BRIEF DESCRIPTION OF THE FIGURES

In addition, various other features of the invention emerge from the accompanying description made with reference to the drawings, which illustrate non-limitative embodiments of the invention and wherein.

It should be noted that, in these figures, the structural and/or functional elements common to the various variants may have the same references.

DETAILED DESCRIPTION

Figure 1:
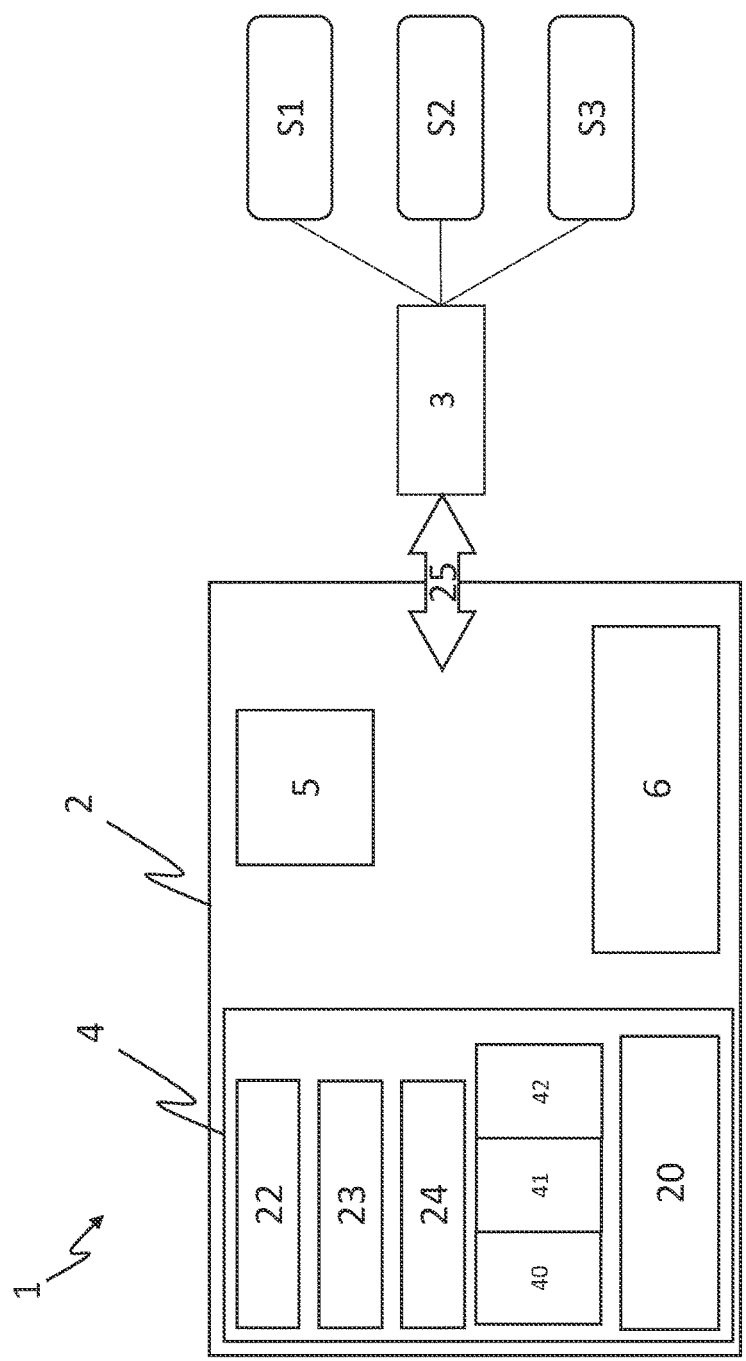
FIG. 1 is a diagram illustrating the architecture of a system including an integrated-circuit module according to the invention and an electronic device.

FIG. 1 shows a system 1 according to the invention, including an integrated-circuit module 2 configured to establish a communication with an electronic device 3, for example here a smartphone, itself making it possible to access a plurality of services S1, S2, S3.

By way of example, a first service S1 corresponds to accessing a first telephone network managed by a first mobile telephony operator, a second service S2 corresponds to accessing a second telephone network managed by a second mobile telephony operator, and a third service S3 corresponds to accessing a bank payment authorization system managed by a bank.

The electronic device includes a plurality of communication interfaces enabling it to access the various services S1, S2, S3. For example, the electronic device includes a first communication interface, here a first transceiver coupled to a telecommunication antenna, for accessing the first service S1 and the second service S2, and a second transceiver coupled to a near-field communication antenna for establishing near-field communications with payment terminals.

The integrated-circuit module 2 is here an electronic chip including a non-volatile memory 4, a processor 5 and a volatile memory 6. The integrated-circuit module 2 is here permanently attached, for example soldered, to the electronic device 3.

The integrated-circuit module 2 includes an operating system known as a "low-level operating system" 20 stored in the non-volatile memory 4 and configured to be executed by the processor 5 in order in particular to control and monitor the software functioning of the module 2.

The non-volatile memory 4 further includes a plurality of execution-context-defining software applications 22, 23, 24, otherwise referred to as a "high-level operating system", configured to be executed by the processor 5. The non-volatile memory 4 includes a plurality of backup locations 40, 41, 42. These locations were created by the microprocessor 5, as will be seen below.

A first software application 22 is here designed to define a first communication profile and allows secure communication with the first service S1. A second software application 23 is designed to define a second communication profile and allows secure communication with the second service S2. A third software application 24 is here a bank payment profile and enables a secure communication to be established with the third service S3.

Execution-context-defining software applications 22, 23, 24 each in particular include information relating to a subscriber, typically the owner of the secure module, information relating to the providers of the services S1 to S3, which are here respectively the first telephone operator, the second telephone operator and the bank, as well as identification keys for establishing said secure communications.

The integrated-circuit module 2 further includes a communication interface 25 allowing communication with the electronic device 3. In the example illustrated, the communication interface 25 complies with the ISO 7816 standard and allows communication with the electronic device 3 in accordance with this standard. In a variant, the interface 25 may be of the SWP (Single Wire Protocol) type, of the I2C (Inter-Integrated Circuit) type, of the USB (Universal Serial Bus) type or of the SPI (Serial Peripheral Interface) type. The module 2 may moreover comprise a plurality of interfaces, in particular a plurality of interfaces of different types.

Figure 2:
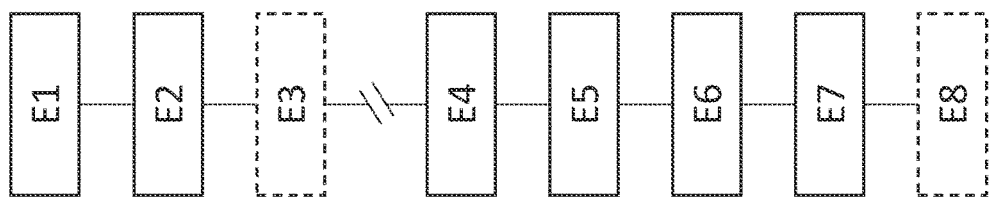
FIG. 2 illustrates an embodiment of the method according to the invention.

FIG. 2 illustrates a method implemented in the integrated-circuit module 2 by the processor 5. This method makes it possible to switch between the executions of the various execution-context-defining software applications.

Initially, the processor 5 executes one of the execution-context-defining software applications, for example here the second software application 23. During said execution, various execution data are stored in the volatile memory 6 and modified according to the performance of the execution of the second software application 23. For example, this information may include an indication according to which the PIN code of the user has been checked, information on an address of an electronic file being read by the processor 5, or a session key for access by the second software application 23 to the second service S2.

The plurality of backup locations 40, 41, 42 are created in the non-volatile memory. Here a first backup location 40 is allocated to the first software application 22, a second backup location 41 is allocated to the second software application 23 and a third backup location is allocated to the third software application 24.

In a first step E1, a suspension command is received and processed by the processor 5. This suspension command is sent by the electronic device 3 via the communication interface 25, for example in response to a command received from the first mobile communication network S1.

In a second step E2, in response to said command, the integrated-circuit module 2 saves the content of the random access memory 6 in the second backup location 41 of the non-volatile memory 4 and stops execution of the second software application 23. The saved data therefore correspond to the status of the second software application 23 at the time of suspension.

In an optional third step E3, the processor 5 provides the electronic device 3 with information on the other software applications, for example the number of software applications and whether they have already been executed and suspended. In FIG. 2, the optional character of the third step E3 is represented by a contour in broken lines of the box corresponding to the third step E3.

In a fourth step E4, the integrated-circuit module 2 executes another execution-context-defining software application, for example here the first software application 22. The execution may for example have been previously triggered in response to an execution command received on the communication interface 25. For example, the current execution of the first software application 22 is a first execution; in other words, the first software application 22 has not yet been suspended. The first memory location 40 therefore does not contain any saved execution data.

Moreover, this fourth step E4 is not necessarily implemented directly following the third step E3. Thus, between the step E3 and the step E4, the integrated-circuit module 2 may perform various other processing operations.

Thus, during step E4, independently of the operations performed by the module 2 between the step E3 and the step E4, the first software application 22 is being executed and the data relating to the previously suspended execution of the second software application 23 are saved in the second memory location 41.

In a fifth step E5, the processor 5 receives a command to switch software applications, that is to say a command including a first field comprising information relating to a suspension of the software application currently being executed and a second field including information relating to a resumption of execution of a previously suspended software application.

Here the first field includes an instruction to suspend the first software application 22 and the second field includes an instruction to resume execution of the second software application 23. In a variant, the suspension and resumption instructions could be contained in two separate commands.

In a sixth step E6, because of the reception of the instruction to suspend the first software application 22, the processor 5 of the module 2, under command of the low-level operating system 20, saves the content of the volatile memory 6 in the first backup location 40 of the non-volatile memory 4 and stops execution of the first software application 22. The saved data therefore correspond to the status of the first software application 22 at the time of suspension.

In a seventh step E7, the processor 5 resumes execution of the second software application 23 by transferring the execution data present in the second backup location 41 to the volatile memory 6. Then the integrated-circuit module 2 executes the second software application 23 using the execution data contained in the volatile memory 6.

In an optional eighth step E8, the integrated-circuit module 2 deletes the content of the second backup location 41.

It may happen that the switching command relating to the application the execution of which must be resumed, transmitted to the processor 5 in the step E5, does not contain any information. For example, the empty field may result from a malfunctioning of the integrated-circuit module, or from the implementation of a routine functioning of the module in which no software application is selected.

In this case, the processor 5 is configured to resume the last suspended application. In a variant, the processor is configured to resume or to initialize a so-called "default software application", previously defined. According to another variant, the processor is configured so as not to take into account the switching command.

The embodiments and implementations of the invention are not limited to those presented above.

Thus, according to another embodiment that can be envisaged, the method implements a check on the software application the resumption of which is demanded. For example, the second step E2 of suspending the second software application 23 includes in this case the creation, by the integrated-circuit module 2, of a check tag, or in other words of an identification value, associated with the second software application 23 and a transmission of said check tag to the electronic device 3.

And, in the fifth step E5, the electronic device 3 transmits the check tag to the integrated-circuit module. For example, the check tag may be contained in the switching command, or contained in a separate command.

The seventh step E7 of resuming execution of the second software application 23 then includes a check, by the processor 5, on the match of said check tag with the second software application 23. In this embodiment, resumption of execution of the second software application 23 is dependent on a positive outcome of the check, that is to say on a match between the check tag and the second software application 23.

In the case of a negative outcome of the check, that is to say in the event of a non-match between the check tag and the second software application 23, the processor 5 of the integrated-circuit module 2 interrupts the resumption of execution. For example, the processor 5 of the integrated-circuit module 2 deletes the content of the second memory location 41 and executes the second software application from the initial state thereof, that is to say a state wherein the software application was prior to any execution. In a variant, the processor 5 may initiate the execution of a default software application, or continue execution of the current software application.

In a variant, another embodiment can be envisaged relating to checking the check tag. This can be done during the sixth step E6 of suspension of the first software application 22. Thus, in the case of a negative outcome of the check, the first software application 22 is not suspended and execution thereof continues.

Although embodiments and implementations of the invention have been described here wherein the electronic device 3 is a smartphone, the invention applies to any electronic device adapted to cooperate with a secure module. In particular, the electronic device 3 may be a payment terminal, a computer, an electricity consumption meter or any connected object.

And, although embodiments and implementations of the invention have been described here wherein the integrated-circuit module 2 is integrated in the electronic device 3, the invention is compatible with a removable integrated-circuit module of the chip card type, such as a SIM card, arranged for example removably in a dedicated housing provided in the electronic device 3. The integrated-circuit module according to the invention may in particular be a set of physically separate modules, for example a plurality of chip cards, each hosting one or more execution-context-defining software applications. More generally, the invention is also compatible with the various types of integrated-circuit module mentioned previously.

Moreover, in the method described in relation to FIG. 2, the plurality of backup locations 40, 41, 42 are created in the non-volatile memory prior to step E1, that is to say during an initial step. In a variant, it is possible that not all the backup locations are created initially but that each first suspension of execution of a software application currently being executed gives rise to a creation, by the processor 5, of a respective backup location in the non-volatile memory and an allocation of this respective backup location to the software application currently being executed, the suspension of which is demanded. Thus, in an embodiment of the method wherein the third software application 24 is never or has never yet been executed, or wherein the third software application 24 is being executed but not yet suspended, the third memory location 42 is not created.

The integrated circuit module 2 has been described here as including the volatile memory 6 and the non-volatile memory 4. In a variant, it is possible for the volatile memory and/or the non-volatile memory to be situated wholly or partly outside the integrated-circuit module 2, for example on the electronic device 3.

The integrated circuit module may be configured to access all kinds of services other than the services for access to the telecommunication network and to the bank payment service described previously. For example, the invention is compatible with loyalty services of commercial brands, and in this case the associated software application serves as an electronic loyalty card, official administrative services, and in this case the associated software application can serve as an electronic passport, electronic driving licenses, electronic elector card or electronic identity card.

Various other modifications can be made to the invention within the scope of the accompanying claims.

The invention claimed is:

1. A method implemented in an integrated-circuit module including a processor configured to access a non-volatile memory in which a plurality of execution-context-defining software applications to be executed by the processor for communication with an electronic device are stored, and to access a volatile memory configured to store execution data of a software application currently being executed, the plurality of software applications including a first software application currently being executed and a second software application previously suspended, the method comprising, on reception of a command from the electronic device:
    suspending execution of the first software application currently being executed comprising
        saving content of the volatile memory in a first backup location of the non-volatile memory, and
        stopping the execution of the first software application;
    resuming the previously-suspended execution of the second software application comprising
        transferring into the volatile memory, from a second backup location of the non-volatile memory, execution data relating to the previously-suspended execution of the second software application, and
        executing the second software application;
    deleting the content of the second backup location following resumption of execution of the second software application; and
    for a first suspension of execution of the first software application, the suspending the execution of the first software application comprising, prior to saving the content of the volatile memory in the first backup location, creating the first backup location in the non-volatile memory and allocating the first backup location to the first software application.

2. The method according to claim 1, wherein the plurality of software applications include at least one communication-profile-defining software application.

3. The method according to claim 1, wherein the integrated-circuit module includes said volatile memory or said non-volatile memory.

4. The method according to claim 1, further comprising creating and allocating a respective backup location of the non-volatile memory for each software application in said plurality of software applications before suspending the execution of the first software application.

5. The method according to claim 1, wherein said suspending includes creating, by the integrated-circuit module, a first check tag associated with the first software application and sending of said first check tag to the electronic device, and
    wherein said resuming execution of the second software application includes sending, by the electronic device to the integrated-circuit module, a second check tag previously created, and checking, by the integrated-circuit module, a match between the second check tag and the second software application.

6. An integrated-circuit module, comprising:
    a communication interface and at least one processor configured to access a non-volatile memory in which a plurality of execution-context-defining software applications are stored, the software applications being configured to be executed by the at least one processor for communication via the communication interface, and to access a volatile memory configured to store execution data of a software application currently being executed, the module being configured to, on reception of a command on communication interface, the plurality of software applications comprising a first software application currently being executed and a second software application previously suspended, the at least one processor being configured to:
    suspend execution of the first software application currently being executed by, the suspension comprising
        saving the content of the volatile memory in a first backup location of the non-volatile memory, and
        stopping the execution of the first software application,
    resume the previously-suspended execution of the second software application comprising
        transferring into the volatile memory, from a second backup location of the non-volatile memory, execution data relating to the previously-suspended execution of the second software application, and
        executing the second software application,
    wherein the module is configured to delete the content of the second backup location following resumption of execution of the second software application and, for a first suspension of the first software application, when suspending execution of the first software application and prior to saving the content of the volatile memory in the first backup location, to create the first backup location in the non-volatile memory and allocate the first backup location to the first software application.

7. The integrated-circuit module according to claim 6, wherein the plurality of software applications includes at least one communication-profile-defining software application.

8. The integrated-circuit module according to claim 6, further comprising said volatile memory or said non-volatile memory.

9. The integrated-circuit module according to claim 6, wherein the integrated-circuit module is configured to create and allocate a respective backup location of the non-volatile memory for each software application in said plurality of software applications.

10. The integrated-circuit module according to claim 7, wherein the integrated-circuit module is configured to
    create, during said suspension of execution of the first software application, a first check tag associated with the first software application and to send said first check tag to the communication interface,
    receive, from the communication interface, a second check tag previously created and check a match between the second check tag and the second software application, and
    resume execution of the second software application when the second check tag corresponds to the second software application.

11. A system comprising:
    the integrated-circuit module according to claim 7; and
    an electronic device configured to communicate with the integrated-circuit module via the communication interface.

12. The system according to claim 11, wherein the electronic device is configured to send said command that includes a first field comprising information relating to the suspension of the first software application and a second field comprising information identifying the second software application.

13. A non-transitory computer-readable medium on which is stored a computer program comprising instructions which, when executed by the processor, performs the method according to claim 1.

* * * * *